United States Patent [19]

Smith

[11] 4,400,422

[45] Aug. 23, 1983

[54] LAMINATED FABRIC HAVING INTEGRAL RAISED AREAS FORMED THEREIN AND METHOD OF MAKING SAME

[75] Inventor: Thomas L. Smith, Columbus, Ohio

[73] Assignee: Colamco, Inc., Columbus, Ohio

[21] Appl. No.: 399,765

[22] Filed: Jul. 19, 1982

Related U.S. Application Data

[63] Continuation of Ser. No. 111,540, Jan. 14, 1980, abandoned.

[51] Int. Cl.$^3$ .................................................. B32B 3/12
[52] U.S. Cl. ................................... 428/160; 156/209; 428/156; 428/161; 428/163; 428/198; 428/246
[58] Field of Search .............. 428/71, 76, 159, 160, 428/161, 162, 163, 196, 198, 204, 246, 252, 423.3; 156/209

[56] References Cited

U.S. PATENT DOCUMENTS

| | | | |
|---|---|---|---|
| 3,256,131 | 6/1966 | Koch et al. | 428/246 |
| 3,265,551 | 8/1966 | Ananian et al. | 156/292 |
| 3,544,418 | 12/1970 | Holtzman | 428/162 |
| 3,844,876 | 10/1974 | Wilson et al. | 428/161 |
| 3,855,043 | 12/1974 | Huroda | 428/204 |
| 3,931,429 | 1/1976 | Austin | 428/159 |
| 4,040,881 | 8/1977 | Wallace | 428/159 |

Primary Examiner—James J. Bell
Attorney, Agent, or Firm—Blakely, Sokoloff, Taylor & Zafman

[57] ABSTRACT

A laminated fabric having an integral raised area formed therein which simulates the appearance of a button, welt or the like, and method of making same. The laminated fabric is comprised of a layer of cloth or vinyl cover material, an intermediate layer of foam and a layer of backing material such as nylon. A form having the shape which corresponds to the desired shape of the raised area is disposed between the foam layer and the cover material. Anhydrous polyurethane foam forming materials are applied in liquid form to the form layer and cover material contact surface and the form layer and backing material contact surface. The unlaminated layers are placed over a die with each of the forms being positioned immediately above a die having protrusions which generally circumscribe the form. Moisture is introduced into the foam forming material and a heated press is applied to the backing material forcing the unlaminated layers down against the die. The resultant heat and pressure cause a foaming reaction of the foam forming materials which results in a foam bonding layer which bonds the cover material in substantial contact with the backing material in the region surrounding the form. The bonding layer also bonds the cover material and the backing material to substantially all of the remainder surface area of the foam layer.

27 Claims, 8 Drawing Figures

LAMINATED FABRIC HAVING INTEGRAL RAISED AREAS FORMED THEREIN AND METHOD OF MAKING SAME

This is a continuation of application Ser. No. 111,540 filed Jan. 14, 1980, now abandoned.

BACKGROUND OF THE INVENTION

1. Field of the Invention

The invention relates to a laminated fabric and method of making same and more particularly to a laminated fabric having integral raised areas formed therein for simulating buttons, welts and the like.

2. Prior Art

Upholstery buttons are frequently used in order to enhance the appearance of upholstered furniture and the like. As will be described in greater detail below, the prior art upholstery buttons are typically pre-covered with an upholstery material such as vinyl and cloth. The pre-covered button is usually provided with an anchor for fastening the button to the upholstered object. In most instances, the button is pulled into the surface of the upholstered object by a cord or the like having one end tied to the button anchor and the other tied to a rigid frame member of the object.

The prior art upholstered buttons are limited in several respects. First, such buttons must be pre-covered and then installed on the upholstered object. This two-step process is time consuming and expensive. Second, it is often desirable to match the fabric used to pre-cover the button with the remainder of the upholstery fabric. If a patterned upholstery fabric is to be used, the buttons must be pre-covered with different materials depending upon where a particular button is to be attached to the upholstered object. The task of matching the pre-covered buttons to the upholstery fabric nessarily increases the cost of manufacturing an upholstered product, especially in mass-production applications.

Furniture, cushions and the like which are used outdoors and in marine applications must, of course, be resistant to water. In such application, a water repellent upholstery material such as vinyl is often used. As previously noted, the prior art pre-covered buttons are usually attached by a length of cord or the like which extends through the cover material. However, the opening in the cover material through which the cord passes will permit water to enter the upholstered object thereby causing damage.

Welts are also often added to upholstered articles for decorative purposes. A conventional welt is usually made by covering a length of flexible tubing with fabric and stitching the pre-covered tubing between the edges of two pieces of fabric so as to join the fabric pieces together. Thus, conventional welts are similar to pre-covered buttons inasmuch as the fabric must be matched. Similarly, several expensive and time-consuming steps are required to fabricate the welts and such conventional welts have some tendency to tear from the fabric, especially when subjected to hard use.

The invention disclosed herein overcomes the limitations of the prior art pre-covered buttons and welts. The laminated fabric and the integral button and/or welts are formed together at the same time rather than in two separate steps. Furthermore, fabric matching is not required since the material covering the integral button and/or welt is part of the same material which covers the remainder of the upholstered object. In addition, there are no openings in the subject laminated fabric which would permit water to enter the upholstered object. Finally, unlike the prior art pre-covered buttons, the subject integral button will remain secured to the upholstered object even if the cord or strap used to hold the button in a recessed position breaks. Similarly, the integral welt will have no tendency to tear from the fabric.

SUMMARY OF THE INVENTION

A laminated fabric having at least one integral raised area formed therein for simulating buttons, welts and the like and method of making same is disclosed. The laminated fabric is comprised of a layer of cloth or vinyl cover material, an intermediate layer of foam of substantial thickness and a layer of backing material such as nylon.

Prior to lamination, the foam layer is prepared by applying a film of anhydrous polyurethane foam forming materials on the contact surfaces between the foam layer and the cover and between the foam layer and the backing material. Moisture is then introduced into the cover and backing material. If an integral button is to be formed, the unlaminated layers are placed over a die having one or more cylindrical-shaped protrusions with the cover material adjacent the die. A button form is inserted between the layer of cover material and the foam layer directly over each of the cylindrical-shaped protrusions. The inside diameter of the cylindrical-shaped die protrustion is slightly larger than the diameter of the button form.

A heated press having a flat working surface is applied to the backing material thereby forcing the unlaminated layers down against the die. The resultant heat and pressure drive the moisture out of the cover and backing material into contact with the anhydrous foam forming materials causing foamed-in-place bonding layers to be created which bond the lower surface of the backing material and the upper surface of the cover material to the foam layer. In the regions surrounding the button forms, the cylindrical-shaped die protrusions cause the cover material to become bonded substantially into contact with the backing material thereby forming the integral button. The heated press is removed once the foamed-in-place bonding layers are cured.

In order to enhance the appearance of the integral buttons of the subject laminated fabric, a means can be provided for anchoring the button to a frame member of the upholstered object. In that case, the rear portion of the button form is provided with an opening for receiving a fastener which is similar to a thumbtack. Once the laminated fabric is formed, the sharpened end of the fastener is pressed through the end of a fabric cord or strap and through the layer of backing material into the button form opening. The fastener is held in place by co-operating gripping members disposed within the button form. The fabric cord, which is secured to the button form, can then be used to pull the integral button into the upholstered object and then tied or otherwise anchored to a convenient rigid frame member of the object. The resultant integral button has the appearance of a conventional recessed pre-covered upholstered button.

An integral welt can be formed in a similar manner, simultaneous with the forming of the integral button if desired. If that case, the die used for forming the laminated fabric is also provided with one or more pairs of parallel elongated protrusions spaced apart from one another a distance slightly greater than the width of the welt to be formed. A welt form, which is preferably a flexible, elongated, cylindrical body made of plastic or similar material, is inserted along with the button forms between the layer of cover material and the foam layer. The welt form is positioned directly over the parallel protrusions so that heated press will force the welt form between the protrusions. When the foamed-in-place bonding layers are cured, the raised area created by the welt form is substantially identical in appearance to a conventional welt.

The die used for forming the laminated fabric can also be provided with elongated protrusions for forming embossed decorative patterns in the fabric. Such protrusions, which are the same height as the button and welt forming protrusions, cause the cover material to be bonded in substantial contact with the backing material thereby forming the embossed patterns.

BRIEF DESCRIPTION OF THE DRAWINGS

FIG. 8 is a cross-sectional side view of the laminated fabric and integral upholstery button covering a seat or the like.

DETAILED DESCRIPTION OF THE INVENTION

Figure 1:
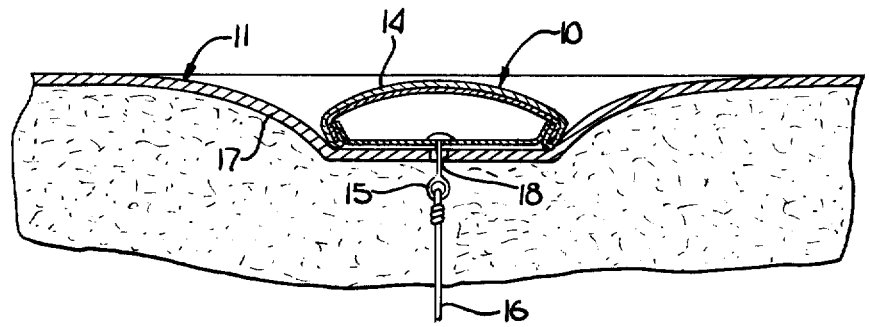
FIG. 1 is a cross-sectional side view of a prior art pre-covered upholstery button.

The present invention can best be understood by first describing a prior art upholstery button. Referring now to FIG. 1 of the drawings, a cross-section of a conventional pre-covered button 10 is shown fastened to an upholstered chair 11 or the like. The button includes a two-piece button form which is comprised of a convex-shaped top section 12 and a relatively flat rear section 13 which is positioned within the top section. Button 10 is assembled in the conventional fashion. A circular-shaped piece of cover material is first placed over the top section 12 with the edges of the material folded under the top section. The rear section is then positioned within the top section with the edges of the cover material 14 disposed therebetween. The button 10 assembly is held together by crimping the edges of the top section 12 around the rear section as shown.

Rear section 13 is provided with an anchor 15 for securing the button to the chair 11. The anchor extends through an opening 18 in the chair cover material 17 and is provided with an eyelet for receiving a length of cord 16. The cord 16 can then be stapled or tied to a rigid frame member of the chair (not shown) thereby securing the button in place. Cord 16 is typically tied in place under tension so that button 10 will be positioned within the depression formed in the chair 11.

The prior art upholstery button is unsuitable in many respects. In outdoor and marine applications where water repellent covering material is used, water can leak into the interior of the furniture through the opening 18 in the cover material. Also, the button cover material 14 is separate from the principal cover material 17, therefore the two cover materials must usually be matched. This matching problem is compounded when a patterned material is used. Furthermore, should either cord 16 or anchor 15 break, button 10 will become completely detached, thereby detracting from the appearance of the chair. Also, the detached button is likely to become lost. As will be seen, the integral upholstery button of the laminated fabric disclosed herein overcomes such limitations in the prior art buttons.

The subject laminated fabric having integral raised areas which simulate upholstery buttons and/or welts is preferably constructed from three layers of material. Although a wide variety of materials and processes for laminating such materials can be used, the laminated fabric and method making same disclosed in U.S. Pat. No. 3,256,131 entitled "Embossed Laminate and Method of Making Same" issued to Koch and Koch (hereinafter referred to as "Koch et al.") has been found to be particularly suitable for carrying out the subject invention. The laminated fabric disclosed in Koch et al. generally comprises an outer layer of cover material, a second intermediate layer of flexible foamed urethane material and a thin layer of backing material. As will be described in greater detail, the intermediate layer is of substantial thickness and is bonded to both the cover material and backing material by two bonding layers of foamed-in-place plastic, both of which cover substantially the entire upper and lower surface of the intermediate layer. Some of the details regarding the lamination of the three layers of material have been deleted. Such details may be found in the Koch et al. patent which is incorporated herein by reference. It should be further noted that although many materials and fabrics may be used for the material and the intermediate layer, the present invention will be described in connection with a cover material of supported vinyl resin film and a sheet of foamed urethane as the intermediate filler layer.

Figure 2:
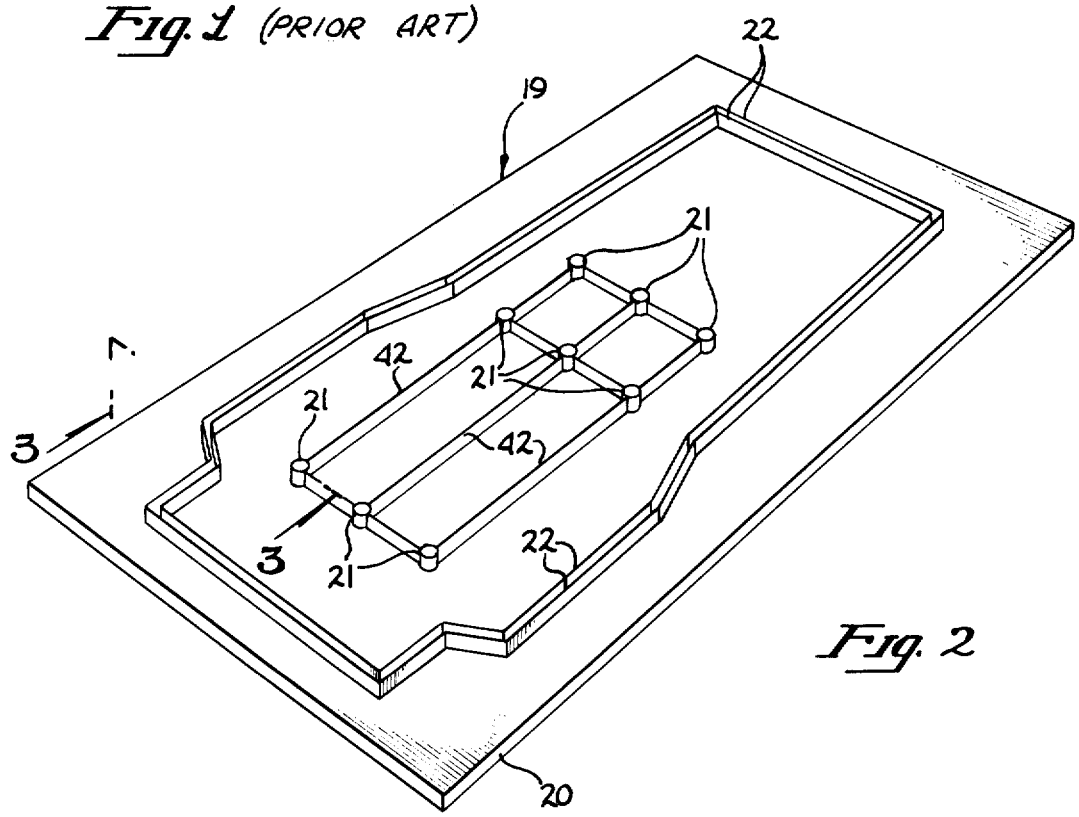
FIG. 2 is a perspective view of a die used in manufacturing the laminated fabric and integral buttons and welts.
Figure 3:
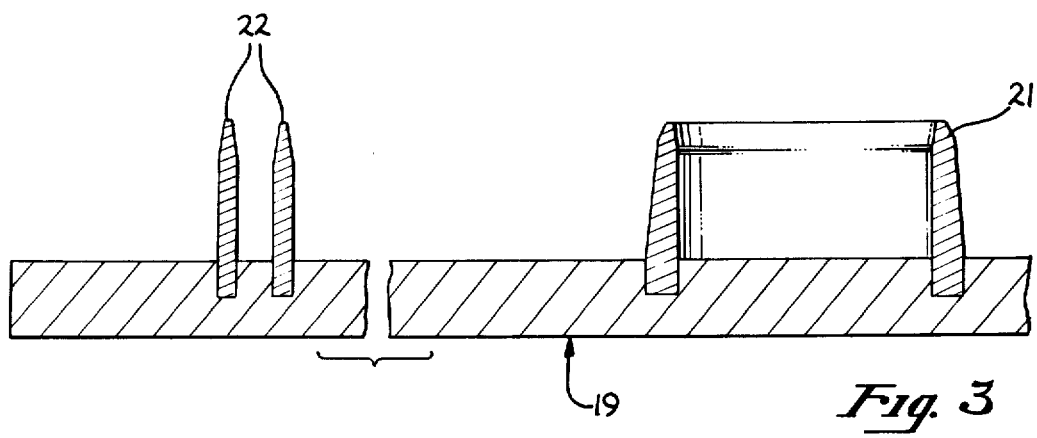
FIG. 3 is a cross-sectional side view of the die taken substantially through section line 3—3 of FIG. 2.

Referring again to the drawings, a die generally indicated by the numeral 19 may be seen in FIGS. 2 and 3. This particular die is used for manufacturing a laminated fabric cover having integral buttons and welts to be used for upholstering the backs of seats and the like. The illustrated finished covers are provided with a total of nine integral buttons surrounded by a welt and interconnected by an embossed decorative pattern. Obviously, die having other configurations can be used to produce laminated fabrics having different button arrangements and decorative patterns.

Die 19 comprises a rigid planar backing 20 made of plywood or the like and a series of metallic raised members or protrusions secured to the top thereof, including nine cylindrical-shaped protrusions 21 for forming the integral button. Of course, the shape of protrusions can be altered for the purpose of forming non-circular buttons. A series of parallel, elongated protrusions or rules 22 are provided for forming the welts as are protrusions 42 for forming the embossed decorative pattern. The height of protrusions 21, 22 and 42 are equal with the inside diameter of cylindrical-shaped protrusions 21 being approximately equal to the diameter of the integral buttons to be produced and the distance between parallel protrusions 22 being approximately equal to the desired width of the welt.

Figure 4:
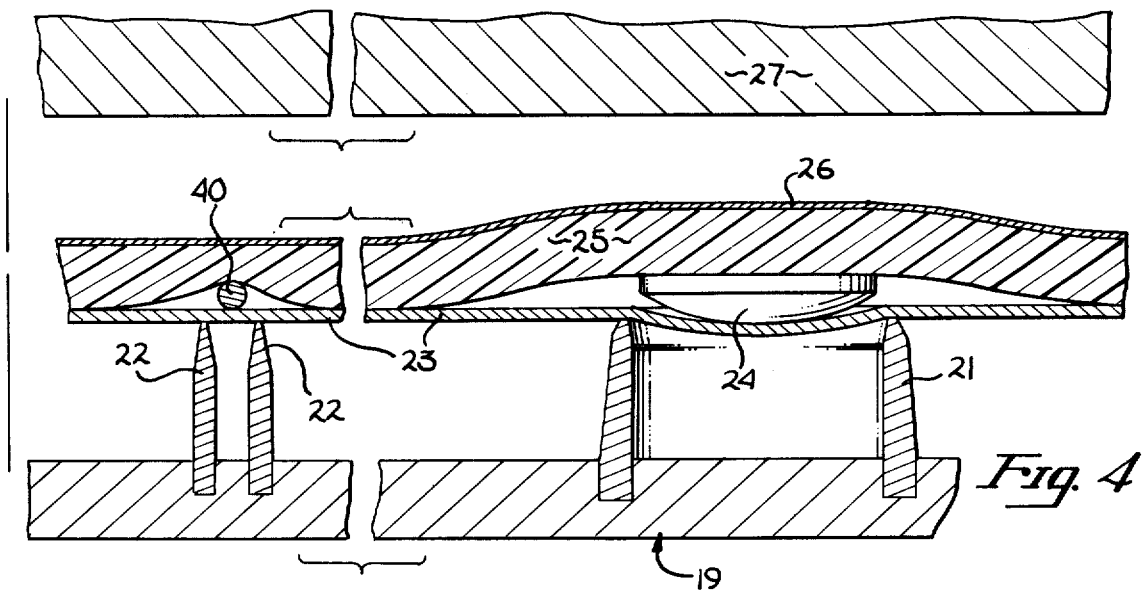
FIG. 4 is a cross-sectional side view of the three layers of material and the button and welt forms prior to the formation of the laminated fabric and integral button and welt.

In accordance with the present invention, the die 19 is placed on a flat surface with protrusions 21, 22 and 42 facing upwards, as shown in FIG. 4. A sheet of cover material 23 made of supported vinyl resin film cut to the appropriate dimensions is positioned over die 19. Button forms 24 which are similar to the forms used in the prior art pre-covered buttons are then placed on the upper surface of the cover material 23 immediately above each of the cylindrical-shaped protrusions 21. Similarly, the welt form 40, which is preferably flexible plastic or foam tubing, although paper or other suitable materials may be used, is placed on the cover material above protrusions 22.

The next step is the preparation of the intermediate flexible foam polyurethane layer 25. The layer 25, which is preferably 1/16 to ½ inch in thickness, is cut to conform to the shape of the cover material. As described in Koch et al., a prepolymer is mixed in anhydrous condition and is applied as a film material to both the upper and lower surfaces of foam layer 25. The prepolymer can be applied by any one of several conventional methods such as spraying, brushing, roller coating or doctor blading, or any combination of such application methods. The thickness of the film to be applied to the surface will be determined by various parameters, but is essentially only a coat of sufficient thickness to wet the top surface of the cell walls of the surface of the foam layer.

The prepared foam layer 25 is then placed over the cover material 23 and over the button form 24 and welt form 40. Just prior to the placement of the foam layer, the fabric backing of the cover material is treated by spraying moisture thereon. Next, the backing material 26, which is made of nylon fabric or the like, is positioned over the foam layer 25. The backing material 26 is also treated with moisture immediately prior to placement over the foam layer 25.

A flat press 27 which moves in a vertical direction is used for forming the laminated structure. The press, which is heated, is used to initiate the foaming reaction of the pre-polymer and to cure the resultant foam which bonds the foam layer 25 to the cover material 23 and to the backing material 26.

Figure 5:
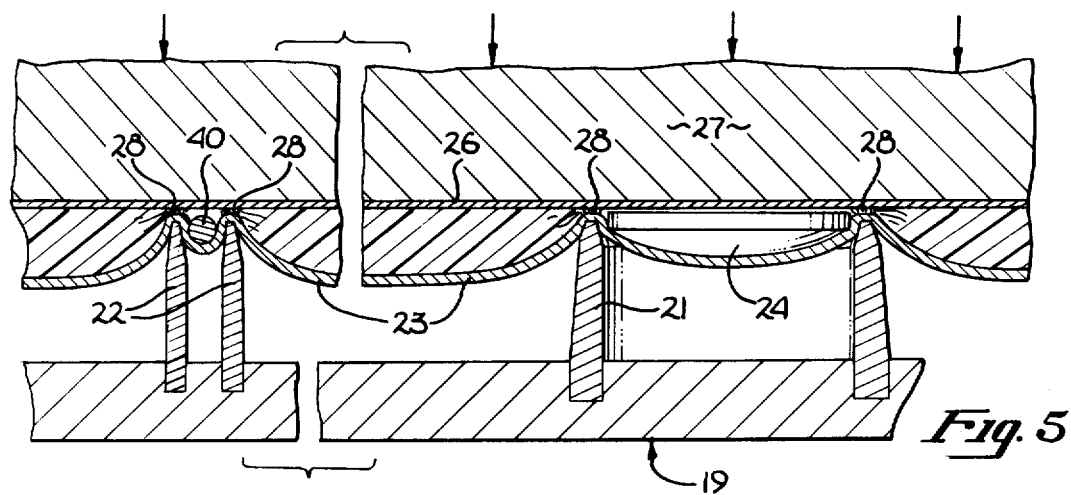
FIG. 5 is a cross-sectional side view of the laminated fabric and integral upholstery button and welt being formed between the die and a heated press.

As can best be seen in FIG. 5, press 27 is applied to the top surface of the backing material causing the laminate structure to become compressed in the regions 28 between the press and the uppermost ends of protrusions 21, 22 and 42. At regions 28, the cover material 23 is bonded substantially into contact with backing material 26. During the forming process, cylindrical-shaped protrusion 21 forces the cover material 23 immediately above button form 24 down onto the form causing the foam layer behind the form to become compressed. Similarly, protrusions 22 force the cover material down onto the welt form 40 causing the foam layer behind the welt form to also become compressed.

The heat of press 27 causes the moisture to be driven from the cover and backing material 23 and 26, respectively. The heat and moisture react with the two coatings of anhydrous prepolymer thereby initiating the foaming-in-place reaction. Press 27 is removed when the resultant foam bonding layers are cured.

Figure 6:
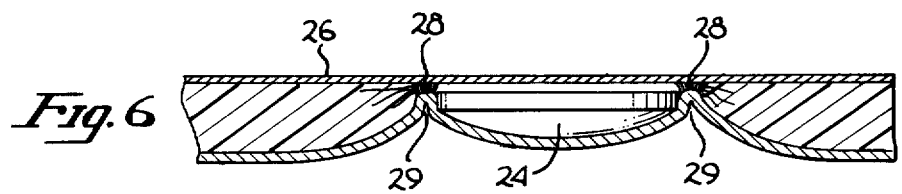
FIG. 6 is a cross-sectional side view of the laminated fabric and integral upholstery button formed in accordance with the present invention.

The finished laminate structure including one of the integral buttons is shown in FIG. 6. At regions 28 of the structure, the outer cover material 23 is firmly bonded to the backing material 26 by a foamed-in-place layer. Button form 24 is accordingly secured in place between the backing material 26 and the cover material 23 with a foamed-in-place bonding layer firmly bonding the back of the form to the backing material. Bonding also takes place over the remainder of the surfaces of the laminated materials so that substantially the entire upper surface of the cover material 23 is bonded to the lower surface of the foam layer 25 and substantially all of the lower surface of the backing material 26 is bonded to the upper surface of layer 25.

Figure 7:
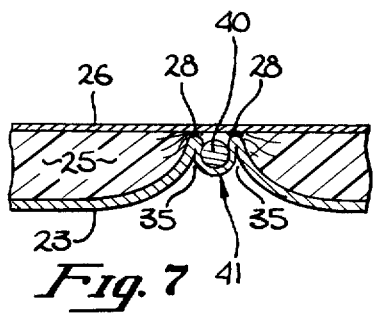
FIG. 7 is a cross-sectional side view of the laminated fabric and integral welt formed in accordance with the present invention.

FIG. 7 shows another part of the finished laminate structure including welt 41. At regions 28 adjacent the welt form 40, the outer cover material is firmly bonded to the backing material 26 by a foamed-in-place layer.

Figure 8:
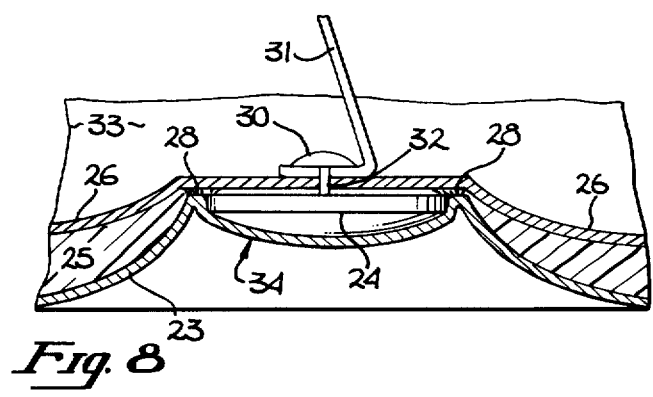

The resultant laminated fabric shown in FIGS. 6 and 7 has integral raised areas which faithfully simulate a conventional welting and conventional button. The integral welt 41, which is covered by a continuous layer of cover material 23, is defined by recesses 35 formed on either side of the welt form 40 by die protrusions 22. Integral button 34, which comprises button form 24 covered by cover material 23 and which is surrounded by recess or indentation 29 formed by protrusion 21, has the appearance of a conventional pre-covered button. The appearance of the button can be enhanced further by staking the button as shown in FIG. 8. In that case, the button form is of the variety which is provided with an opening in the rear portion thereof for receiving an anchor 30 which is somewhat similar to a conventional thumbtack. Anchor 30 is fastened to the button form by pressing the pointed shaft 32 of the anchor through the end of a length of fabric strap or cord 31, through the back cover material and into an opening in the rear of the form. Shaft 32 is provided with a series of serrations which are gripped by co-operating members located in the button form thereby securing the cord to the form. Once the laminated cover is installed on the structure to be upholstered, such as seat 33, cord 31 is attached to a rigid seat frame member (not shown). The cord is secured under tension so that the integral button will be pulled into the seat thereby creating a visual effect very similar to that of the prior art pre-covered button shown in FIG. 1. Should cord 31 break for any reason, the button 34 will remain attached to the seat 33.

Although the present invention has been described with supported vinyl as a cover material, cloth and other fabrics may also be employed. Similarly, although the foamed-in-place bonding described in Koch et al. is the preferred method of bonding the cover material to the backing material, other bonding techniques can be used. For example, conventional adhesives can be used for bonding or, if both the cover and backing material are vinyl, thermal bonding can be utilized. It should be further noted that materials other than flexible foam, such as batting or the like, can be used as the filler layer between the cover and backing material. Whatever material is used as the filler layer, such layer should be of substantial thickness so that the embossed impressions in the cover material surrounding the integral button and welt and the other embossed decorative impressions are of substantial depth.

It is important to further note that the layer of backing material, although preferred can be deleted if desired. The process for fabricating such a two layer laminated fabric and integral button and/or welt is identical to that for fabricating the three layer fabric, except, of course, the layer of backing material is not used.

Thus, a laminated fabric having integral raised areas formed wherein which simulate buttons, welts and the like and a method of making same have been disclosed. The simulated integral welt and buttons are more durable than a conventional stitched welt and buttons. Inasmuch as the material surrounding the integral welt and buttons is integral with the cover material, the subject invention is particularly suitable for use in outdoor and marine applications.

I claim:

1. A laminated fabric having at least one integral raised area formed therein comprising:
    a first layer of cover material having a predetermined surface area;
    a second layer of compressible foamed material of substantial thickness adjacent said first layer, said second layer having a predetermined surface area substantially corresponding to the predetermined surface area of the cover material;
    at least one form disposed between said first and second layers and having a predetermined shape which generally corresponds to the desired shape of a corresponding one of said raised areas, said form overlying a portion of the predetermined surface area of said second layer;
    said first layer covering said form and said second layer over the predetermined surface area thereof and being bonded to said second layer in the region surrounding said form such that the portion of the first layer which covers said form substantially conforms to the predetermined shape of said form.

2. The laminated fabric of claim 1 wherein said second layer is made of flexible foamed urethane sheet material.

3. The laminated fabric of claim 2 wherein said cover material is vinyl resin film.

4. The laminated fabric of claim 2 wherein said cover material is cloth fabric.

5. The laminated fabric of claim 2 wherein said form is a welt form.

6. The laminated fabric of claim 5 wherein said welt form is a length of flexible tubing.

7. The laminated fabric of claim 2 wherein said form is a button form.

8. The laminated fabric of claim 7 further including an anchor means which extends through said second layer for anchoring said button form to a rigid member.

9. The laminated fabric of claim 8 wherein said anchor means comprises an anchor attached to said button form and a length of flexible cord attached to said anchor and wherein the rigid member is a frame member of the object which is to be upholstered with said laminated fabric.

10. The laminated fabric of claim 1 further comprising a third layer of backing material adjacent said second layer at the surface thereof opposite said first layer.

11. A laminated fabric having at least one integral raised area formed therein comprising:
    a first layer of cover material having a predetermined surface area;
    a second layer of compressible material of substantial thickness adjacent said first layer, said second layer having a predetermined surface area substantially corresponding to the predetermined surface area of the cover material;
    a third layer of backing material adjacent said second layer at the surface thereof opposite said first layer;
    at least one form disposed between said first and third layers and having a predetermined shape which generally corresponds to the desired shape of a corresponding one of said raised areas, said form overlying a portion of the predetermined surface area of said second layer; and
    said first layer covering said form and said second layer over the predetermined surface area thereof, said first and third layers being bonded together in the region surrounding said form such that the portion of the first layer which covers said form substantially conforms to the predetermined shape of said form.

12. The laminated fabric of claim 11 wherein said second layer is made of flexible foamed urethane sheet material.

13. The laminated fabric of claim 11 wherein said first layer is bonded substantially into contact with said third layer.

14. The laminated fabric of claim 13 including a bonding layer of foamed-in-place urethane plastic.

15. The laminated fabric of claim 14 wherein said bonding layer of foamed-in-place urethane plastic further bonds said first layer to said second layer and said second layer to said third layer over substantially the entire surface thereof.

16. The laminated fabric of claim 13 wherein said cover material is vinyl resin film.

17. The laminated fabric of claim 13 wherein said cover material is cloth fabric.

18. The laminated fabric of claim 13 wherein said form is a welt form.

19. The laminated fabric of claim 13 wherein said form is a button form.

20. The laminated fabric of claim 19 further including an anchor which extends through said second and third layers for anchoring said button form to a rigid member.

21. The laminated fabric of claim 20 wherein said anchor means comprises an anchor attached to said button form and a length of flexible cord attached to said anchor and wherein the rigid member is a frame member of the object which is to be upholstered with said laminated fabric.

22. The laminated fabric of claim 20 wherein said first layer is further bonded substantially into contact with said third layer in a predetermined embossed pattern.

23. The laminated fabric of claim 1 wherein said second layer is compressed in the area underlying said form.

24. The laminated fabric of claim 11 wherein said second layer is compressed in the area underlying said form.

25. A method of forming a laminated fabric having at least one integral raised area comprising:
    disposing at least one form between a first layer of cover material and a second layer of flexible foam material of substantial thickness, each of said forms having a shape which generally corresponds to the desired shape of a corresponding one of said raised areas;
    bonding said first layer to said second layer; and
    forcing said first layer in the region surrounding each of said forms against the corresponding region of said second layer and causing said corresponding region of said second layer underlying said form to become compressed such that said raised areas are formed on said first layer on the side thereof opposite said forms and adjacent thereto.

26. The method of claim 25 wherein said bonding comprises the following steps:
   (i) applying a film of anhydrous polyurethane foam forming materials at the contact surface between said first and said second layers;
   (ii) introducing moisture to said anhydrous film sufficient to cause forming reaction to said polyurethane materials; and
   (iii) applying heat and pressure to said first and second layers, said heat being sufficient to cure said polyurethane material, said pressure being in a predetermined pattern such that said first layer is bonded to said second layer with recesses formed in said first layer in the region surrounding said form.

27. A method of forming a laminated fabric with at least one integral raised area formed therein, said fabric having a first layer of cover material, a second layer of compressible foamed material and a third layer of cover material with said second layer juxtaposed between said first and third layers comprising:

applying a film of anhydrous polyurethane foam forming materials on the contact surfaces between said first and second layers on said second and third layers;

forming a laminate structure by bringing said first and second layers into surface contact and said second and third layers into surface contact with at least one form having a shape which corresponds to the desired shape of a corresponding one of said raised areas, being disposed between said first and third layer;

introducing moisture to said anhydrous film sufficient to cause foaming reaction of said polyurethane materials; and applying heat and pressure to said laminate structure, said heat being sufficient to cure said polyurethane material, said pressure being in a predetermined pattern such that the first layer is bonded by said polyurethane material substantially into contact with said third layer in the region surrounding each of said forms said second layer being compressed under said form such that said raised areas are formed on said first layer on the side thereof opposite said forms and adjacent thereto.

* * * * *